United States Patent [19]

Vorbach et al.

[11] Patent Number: 6,038,650
[45] Date of Patent: Mar. 14, 2000

[54] METHOD FOR THE AUTOMATIC ADDRESS GENERATION OF MODULES WITHIN CLUSTERS COMPRISED OF A PLURALITY OF THESE MODULES

[75] Inventors: Martin Vorbach; Robert Münch, both of Karlsruhe, Germany

[73] Assignee: PACTGmbH, Munich, Germany

[21] Appl. No.: 08/946,999

[22] Filed: Oct. 8, 1997

[30] Foreign Application Priority Data

Feb. 4, 1997 [DE] Germany .................. 197 04 044

[51] Int. Cl.[7] .......................................... G06F 9/38
[52] U.S. Cl. ................ 711/219; 711/217; 711/218; 711/220
[58] Field of Search ................... 711/217, 218, 711/219, 220; 395/800.1, 800.11, 800.12, 800.15, 800.13

[56] References Cited

U.S. PATENT DOCUMENTS

| Re. 34,363 | 8/1993 | Freeman .................................. 326/40 |
| 4,706,216 | 11/1987 | Carter ..................................... 365/94 |
| 4,739,474 | 4/1988 | Holsztynski et al. ............. 395/800.14 |
| 4,761,755 | 8/1988 | Ardini et al. ........................... 708/518 |
| 4,811,214 | 3/1989 | Nosenchuck et al. ............ 395/800.11 |
| 4,870,302 | 9/1989 | Freeman .................................. 326/41 |
| 4,901,268 | 2/1990 | Judd ........................................ 708/513 |
| 4,967,340 | 10/1990 | Dawes ................................. 395/800.13 |
| 5,014,193 | 5/1991 | Garner et al. ........................... 710/18 |
| 5,015,884 | 5/1991 | Agrawal et al. ........................ 326/39 |

(List continued on next page.)

FOREIGN PATENT DOCUMENTS

| 0 221 360 | 5/1987 | European Pat. Off. . |
| 0428327A1 | 5/1991 | European Pat. Off. . |
| 748 051 A2 | 12/1991 | European Pat. Off. . |
| 0539595A1 | 5/1993 | European Pat. Off. . |
| 0 678 985 | 10/1995 | European Pat. Off. . |
| 0 726 532 | 8/1996 | European Pat. Off. . |
| 735 685 | 10/1996 | European Pat. Off. . |
| 4416881 | 11/1994 | Germany . |
| WO 90/11648 | 10/1990 | WIPO . |
| 94/08399 | 4/1994 | WIPO . |

OTHER PUBLICATIONS

Villasenor, John, et al., "Configurable Computing." *Scientific American*, vol. 276, No. 6, Jun. 1997, pp. 66–71.
Villasenor, John, et al., "Configurable Computing Solutions for Automatic Target Recognition," *IEEE*, 1996 pp. 70–79.

(List continued on next page.)

*Primary Examiner*—Eddie P. Chan
*Assistant Examiner*—Than Nguyen
*Attorney, Agent, or Firm*—Kenyon & Kenyon

[57] ABSTRACT

A method of automatic address generation by units within clusters of a plurality of such units in which individual configurable elements of a unit can be addressed. It is thus possible to address the individual elements directly for reconfiguration. This is a prerequisite for being able to reconfigure parts of the unit by an external primary logic unit without having to change the entire configuration of the unit. In addition, the addresses for the individual elements of the units are automatically generated in the X and Y directions, so that the addressing scheme represents the actual arrangement of units and configurable elements. Furthermore, manual allocation of addresses is not necessary due to automatic address generation. In accordance with the present invention, a cluster is provided with a number of configurable units, each having two inputs for receiving the X address of the last element of the preceding unit in the X direction (row) and the Y address of the last element of the preceding unit in the Y direction (column) and having two outputs to relay to the next unit the position of the last element of the unit in the X direction and in the Y direction.

16 Claims, 9 Drawing Sheets

| | | | |
|---|---|---|---|
| 5,021,947 | 6/1991 | Campbell et al. | 395/800.25 |
| 5,023,775 | 6/1991 | Poret | 326/40 |
| 5,081,375 | 1/1992 | Pickett et al. | 326/41 |
| 5,109,503 | 4/1992 | Cruickshank et al. | 395/500 |
| 5,123,109 | 6/1992 | Hillis | 395/800.22 |
| 5,125,801 | 6/1992 | Nabity et al. | 417/44.7 |
| 5,128,559 | 7/1992 | Steele | 326/38 |
| 5,142,469 | 8/1992 | Weisenborn | 364/46 |
| 5,204,935 | 4/1993 | Mihara et al. | 706/4 |
| 5,208,491 | 5/1993 | Ebeling et al. | 326/41 |
| 5,226,122 | 7/1993 | Thayer et al. | 395/500 |
| 5,233,539 | 8/1993 | Agrawal et al. | 364/489 |
| 5,247,689 | 9/1993 | Ewert | 710/131 |
| 5,287,472 | 2/1994 | Horst | 365/189.08 |
| 5,301,344 | 4/1994 | Kolchinsky | 395/800.32 |
| 5,303,172 | 4/1994 | Magar et al. | 908/406 |
| 5,336,950 | 8/1994 | Popli et al. | 326/39 |
| 5,361,373 | 11/1994 | Gilson | 395/800.01 |
| 5,418,952 | 5/1995 | Morley et al. | 395/800.14 |
| 5,421,019 | 5/1995 | Holsztynski et al. | 395/800.14 |
| 5,422,823 | 6/1995 | Agrawal et al. | 364/489 |
| 5,426,378 | 6/1995 | Ong | 326/39 |
| 5,430,687 | 7/1995 | Hung et al. | 365/230.08 |
| 5,440,245 | 8/1995 | Galbraith et al. | 326/38 |
| 5,442,790 | 8/1995 | Nosenchuck | 395/707 |
| 5,444,394 | 8/1995 | Watson et al. | 326/45 |
| 5,448,186 | 9/1995 | Kawata | 326/41 |
| 5,455,525 | 10/1995 | Ho et al. | 326/41 |
| 5,457,644 | 10/1995 | McCollum | 708/230 |
| 5,473,266 | 12/1995 | Ahanin et al. | 326/41 |
| 5,473,267 | 12/1995 | Stansfield | 326/41 |
| 5,475,583 | 12/1995 | Bock et al. | 364/141 |
| 5,475,803 | 12/1995 | Stearns et al. | 395/136 |
| 5,483,620 | 1/1996 | Pechanek et al. | 706/41 |
| 5,485,103 | 1/1996 | Pedersen et al. | 326/41 |
| 5,485,104 | 1/1996 | Agrawal et al. | 326/38 |
| 5,489,857 | 2/1996 | Agrawal et al. | 326/41 |
| 5,491,353 | 2/1996 | Kean | 257/208 |
| 5,493,239 | 2/1996 | Zlotnick | 326/38 |
| 5,497,498 | 3/1996 | Taylor | 710/104 |
| 5,506,998 | 4/1996 | Kato et al. | 395/800.29 |
| 5,510,730 | 4/1996 | El Gamal et al. | 326/41 |
| 5,511,173 | 4/1996 | Yamaura et al. | 395/598 |
| 5,513,366 | 4/1996 | Agarwal et al. | 395/800.22 |
| 5,521,837 | 5/1996 | Frankle et al. | 364/491 |
| 5,522,083 | 5/1996 | Gove et al. | 395/800.22 |
| 5,532,693 | 7/1996 | Winters et al. | 341/51 |
| 5,532,957 | 7/1996 | Malhi | 365/154 |
| 5,535,406 | 7/1996 | Kolchinsky | 395/800 |
| 5,537,057 | 7/1996 | Leong et al. | 326/41 |
| 5,537,601 | 7/1996 | Kimura et al. | 395/800.35 |
| 5,541,530 | 7/1996 | Cliff et al. | 326/41 |
| 5,544,336 | 8/1996 | Kato et al. | 710/131 |
| 5,548,773 | 8/1996 | Kemney et al. | 395/800.11 |
| 5,555,434 | 9/1996 | Carlstedt | 395/800.38 |
| 5,559,450 | 9/1996 | Ngai et al. | 326/40 |
| 5,561,738 | 10/1996 | Kinerk et al. | 706/4 |
| 5,570,040 | 10/1996 | Lytle et al. | 326/41 |
| 5,583,450 | 12/1996 | Trimberger et al. | 326/41 |
| 5,586,044 | 12/1996 | Agrawal et al. | 364/489 |
| 5,587,921 | 12/1996 | Agrawal et al. | 364/489 |
| 5,588,152 | 12/1996 | Dapp et al. | 395/800.16 |
| 5,590,345 | 12/1996 | Barker et al. | 395/800.11 |
| 5,590,351 | 12/1996 | Sowadsky et al. | 395/800.23 |
| 5,708,842 | 1/1998 | Ikegaya et al. | 395/800.36 |
| 5,822,608 | 10/1998 | Dieffenderfer et al. | 395/800.2 |
| 5,842,034 | 11/1998 | Bolstad et al. | 395/800.11 |

OTHER PUBLICATIONS

Tau, Edward, et al., "A First Generation DPGA Implementation," *FPD'95*, pp. 138–143.

Athanas, Peter, et al., "IEEE Symposium on FPGAs For Custom Computing Machines," *IEEE Computer Society Press*, Apr. 19–21, 1995, pp. i–vii, 1–222.

Bittner, Ray, A., Jr., "Wormhole Run–Time Reconfiguration: Conceptualization and VLSI Design of a High Performance Computing System," *Dissertation*, Jan. 23, 1997, pp. i–xx, 1–415.

Myers, G., Advances in Computer Architecture, Wiley–Interscience Publication, 2nd ed., John Wiley & Sons, Inc. pp. 463–494, 1978.

M. Saleeba, "A Self–Contained Dynamically Reconfigurable Processor Architecture", Sixteenth Australian Computer Science Conference, ASCS–16, QLD, Australia, Feb., 1993.

M. Morris Mano, "Digital Design," by Prentice Hall, Inc., Englewood Cliffs, New Jersey 07632, 1984, pp. 119–125, 154–161.

Maxfield, C. "Logic that Mutates While–U–Wait" EDN (Bur. Ed) (USA), EDN (European Edition), Nov. 7, 1996, Cahners Publishing, USA .

METHOD FOR THE AUTOMATIC ADDRESS GENERATION OF MODULES WITHIN CLUSTERS COMPRISED OF A PLURALITY OF THESE MODULES

1. BACKGROUND OF THE INVENTION

1.1 Related Art

When programmable units (FPGAs, DPGAs, DFPs (according to German Patent 44 16 881 A1)), summarized below as "units" for the sake of simplicity, are combined into a cluster, there are two methods of performing the programming. A cluster is a multi-dimensional interconnected array of units or groups of units.

For each unit there is a primary logic unit (PLU) with the help of which the unit is programmed. In other words, a PLU addresses a unit of the cluster. This PLU may be designed as an EPROM or as a computer system. The data can be transmitted to the unit in a serial or parallel form. In parallel data transmission, the data in the unit is converted to a serial bit stream which configures the unit.

Only one PLU is available for all units of the cluster. The individual units are daisy-chained. Programming is accomplished by a serial bit stream. The PLU addresses only the first unit and the data is sent through a serial line to the units of the cluster. The data is passed as a bit stream through all the units of the cluster and thus configures their programmable elements. Here again, the configuration data can be transmitted in serial or parallel form. The PLU can again be embodied as an EPROM or as a computer system.

When using a computer system, there is the possibility of using the address lines for a chip select to address and configure individual units separately.

With a parallel computer, a fixed address by means of which addressing is performed is assigned to each of its processors.

1.2 Problems

The previous methods of addressing a unit have a number of problems and weaknesses.

Due to the method of addressing, the actual arrangement of units is not represented.

It is impossible to address a single element of any unit in the cluster to perform reconfiguration. Only a complete unit can be addressed, and it must be reconfigured as a whole.

Due to the fixed assignment of addresses to the individual processors of a parallel computer, there is a static assignment of addresses. In addition, a large amount of resources are needed in allocating addresses for the individual processors.

1.3 Improvement Through the Invention

Individual configurable elements of a unit can be addressed with the help of this invention. It is thus possible to address the individual elements directly for reconfiguration. This is a prerequisite for being able to reconfigure parts of the unit by an external PLU without having to change the entire configuration of the unit. In addition, the addresses for the individual elements of the units are automatically generated in the X and Y directions, so that the actual arrangement of units and configurable elements is represented. Manual allocation of addresses is not necessary due to automatic address generation.

The patent claims concern details and special embodiments as well as features of address generation according to this invention.

2. DESCRIPTION OF THE INVENTION

2.1 Review of the Invention; Abstract

A cluster contains a number of configurable units, each having two inputs for receiving the X address of the last element of the preceding unit in the X direction (row) and the Y address of the last element of the preceding unit in the Y direction (column) and having two outputs to relay to the next unit the position of the last element of the unit in the X direction and in the Y direction.

The origin of the coordinate system for this document is in the upper left corner of the cluster, so the X address increases toward the right and the Y address increases toward the lower edge. Of course, any other position can also be selected for the origin of the coordinate system.

Each of the units of the cluster contains a logic unit for calculation of the X and Y addresses of the last cell of the unit. This logic unit comprises a register for the X address and one for the Y address in which the maximum number of elements in the X and Y directions of the unit is stored and an adder which calculates the address of the last element of the unit in the X and Y directions and relays it over the two outputs. Each unit in turn contains a plurality of configurable elements which receive an allocated address and can be addressed with this address within the unit and the cluster. The address of the element is calculated from the address of the preceding element in the X and Y directions. This results in a linear address space in which all the elements of the units of the cluster can be addressed. The address of the preceding element can originate from an element of this unit or the preceding unit. To be able to address an element in a unit within a cluster, each element contains a comparator where a check is performed to determine whether an address arriving from the outside corresponds to the address of the element.

2.2 Detailed Description of the Invention

A number of configurable units are combined in a cluster. The configurable units are arranged in rows and columns. A number of configurable elements are contained in each individual unit.

Each unit of the cluster is connected by two buses to its neighbors in the rows and by two buses to its neighbors in the columns. One bus serves to receive the address data from the preceding neighbor and one bus serves to send data to the next neighbor. Over these lines, the X address (position within the row) of the last element of the preceding unit is transmitted in the X direction, and the Y address (position within the column) of the last element of the preceding unit is transmitted in the Y direction. This can be accomplished over a serial line or in parallel over multiple lines, the number of which will depend on the number of units in the cluster and the elements contained in the units.

A logic unit within the unit calculates the address of the last element of the unit in the X direction and the last element of the unit in the Y direction. To do so, the address of the last element in the X direction (Y direction) of the preceding unit is added by an adder to the number of elements in the x direction (Y direction) stored in a register. This yields the address which corresponds to the maximum extent of the elements in the X,Y direction within the unit. This address is retransmitted to the next unit. One register and one adder are needed per direction. The base address for the elements must be allocated to the units of the first column and the first row of the cluster by an external signal, because they do not have any direct predecessors there.

For the configurable elements in the units, an address is calculated form the address of the preceding element. This preceding element may be in the same unit or in the preceding unit. For transmission of the addresses, the elements are also linked together, like the units, by one or more lines. Here again, the address may be transmitted in the serial or parallel mode, as with the units. In the calculation of the address of the element, a one is added to the address of the preceding element in the X direction (Y direction). To be able to address an element, each element contains a comparator which checks on whether the address of the element matches an address which is supplied internally or externally (by a PLU) and should address an element of a unit of the cluster for reconfiguration, etc. In this comparator, the X and Y addresses of the element are compared with the X and Y addresses applied for addressing. This is done in one comparator for each address or one comparator for both addresses at the same time. The outputs of the comparators are linked via an AND gate and form the enable signal for the configurable element. This means that the element is addressed only when the external address signal (from a PLU) matches the automatically generated address of the element.

It would obviously be possible to omit the logic unit for calculating the address of the last element in the X and Y directions. To do so, the address calculated by the last element in the X and Y directions would have to be brought out and retransmitted to the next unit.

In addition, it would also be conceivable to design the cluster not only in two dimensions (X and Y directions) but also to add a third direction (Z direction) or even more dimensions. Each unit then needs another register for each dimension in which the number of configurable elements of the unit in this dimension is stored, and another adder for each dimension to calculate the address of the last element in the X and Y directions within the unit in this dimension. This yields an N-dimensional array. Of course, these additional dimensions, except the Z direction, no longer have any physical representation, but instead they are described only by an expansion of the address space to N dimensions. The same expansion of the address space to N dimensions is also conceivable for the configurable elements within a unit.

3. BRIEF DESCRIPTION OF THE DIAGRAMS

FIG. 1: a) Unit with automatic address generation
b) Logic unit for address generation with parallel input and output signals.
c) Logic unit for address generation with serial input and output signals.
d) Wiring of two successive logic units for address generation.
e) Signal characteristics of the data signal and enable signal in the wiring of two logic units for address generation.

FIG. 3: a) Logic unit for address generation and addressing an element within a unit with parallel transmission of the address.
b) Logic unit for address generation and addressing an element within a unit with serial transmission.
c) Serial adder.

FIG. 5: a) Unit with several configurable elements and an alternative type of addressing.
b) Logic unit for addressing an element within a unit with alternative addressing.

4. DETAILED DESCRIPTION OF THE DIAGRAMS

Figure 1A:
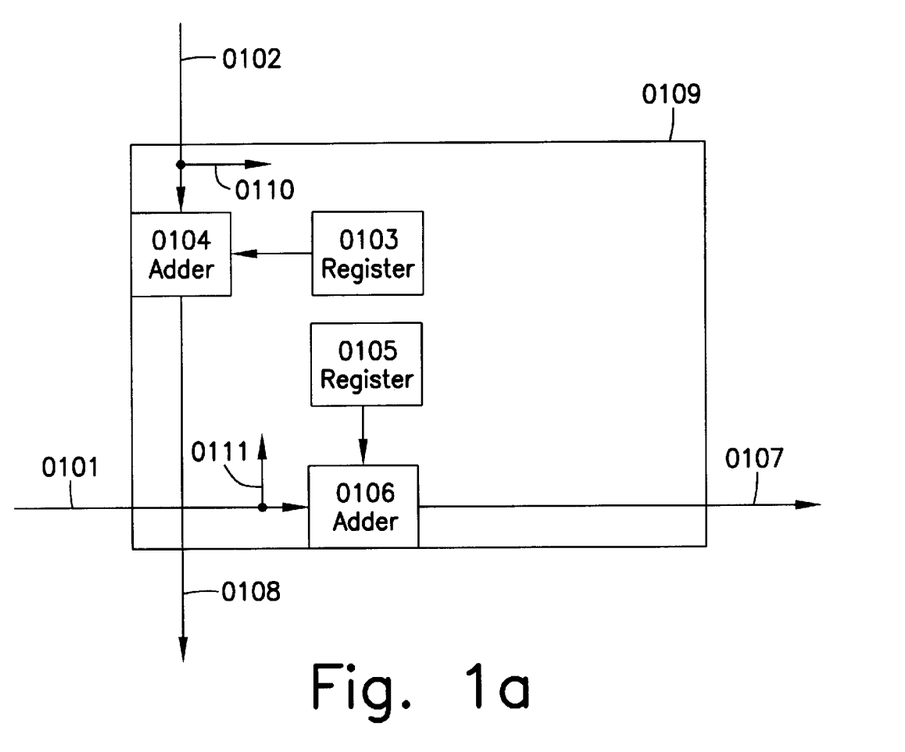

FIG. 1a) shows a unit 0109 of a cluster. It receives the X position of the last element in the X direction from the preceding unit over connection 0101. The Y position is transmitted to the unit over connection 0102. The number of the elements in the X direction is stored in register 0105; then the address applied over connection 0101 is added to this number with the help of an adder 0106. A similar procedure is followed with the Y address. Register 0103 stores the number of elements of the unit in the Y direction and the address applied over connection 0102 is added to it in adder 0104. These two new automatically generated values form the X and Y base addresses of the next unit in the X and Y directions. They are available to the next unit over connection 0107 for the X address and 0108 for the Y address. Connections 0110 and 0111 serve to transmit the X and Y addresses within the unit to be available for calculation of the addresses of the configurable elements.

Figure 1B:
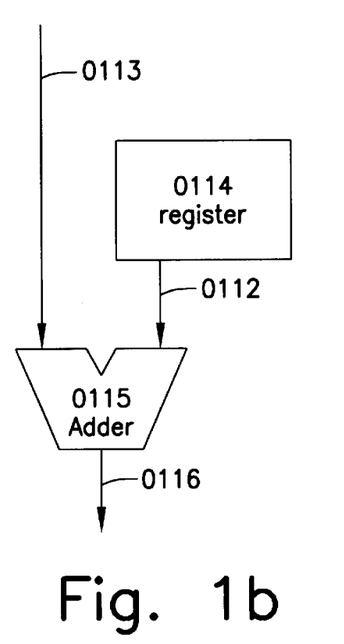

FIG. 1b) shows the logic unit with input and output signals transmitted in parallel to calculate the address of the last element in the X direction (Y direction) of the unit. The data on the number of configurable elements of the unit in the X direction (Y direction)is transmitted over bus 0112 from register 0114 to adder 0115, where the address of the last element of the preceding unit in the X direction (Y direction) is added 0113. The calculated address is retransmitted from adder 0115 to the next unit over bus 0116.

Figure 1C:
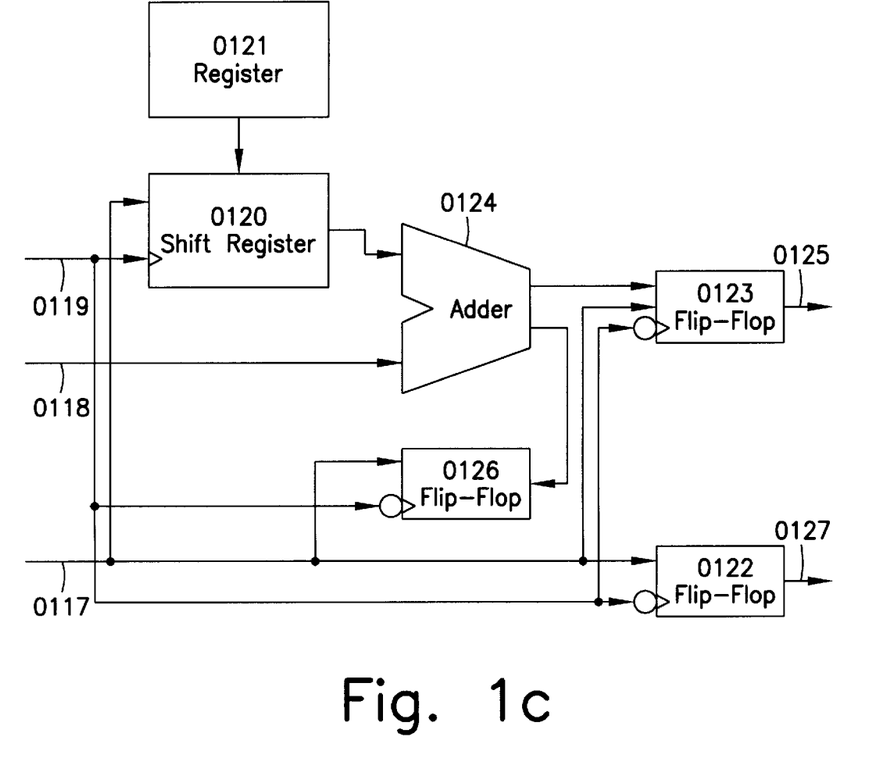

FIG. 1c) shows the logic unit for storage and calculation of the address with a serial input and output signal. The data on the address of the preceding unit in the X direction (Y direction) are transmitted serially over a line 0118. The clock signal of the unit is transmitted over line 0119. The serial data stream of line 0118 goes to adder 0124 which adds sequentially the number of elements stored in the unit. To do so, the number of elements, stored in register 0121, is loaded into shift register 0120 at the start. Shift register 0120 is in turn controlled by clock pulse 0119, so that it sends the individual bits of the address to adder 0124 over line 0118 in synchronization with the bits of the data stream. The data of the shift register is advanced further with the positive clock pulse edge. The individual bits are added sequentially in adder 0124 and sent on to output flip-flop 0123, again sequentially. This data is transmitted to the next unit over line 0125. Flip-flop 0126 serves to store the carry-over from addition of the two bits, which must be taken into account again in addition of the next two bits. Output flip-flop 0123 and flip-flop 0126 accept data at the negative clock pulse edge. An enable signal is sent to flip-flops 0122, 0123, 0126 and shift register 0120 over connection 0117. Flip-flop 0122 receives the enable signal at the negative clock pulse edge and relays it to the next units over line 0127.

The data transmission takes place as follows. The data is entered over line 0118. At the same time, an enable signal having the same length as the transmitted data comes over line 0117. Then the new address is calculated in adder 0124 and transmitted to the next unit over flip-flop 0123. The enable signal is sent to the next unit over flip-flop 0122. As the data and the enable signal are received into the flip-flops with the negative edge of the clock pulse, these two signals go to the next unit delayed by a half clock pulse.

Figure 1D:
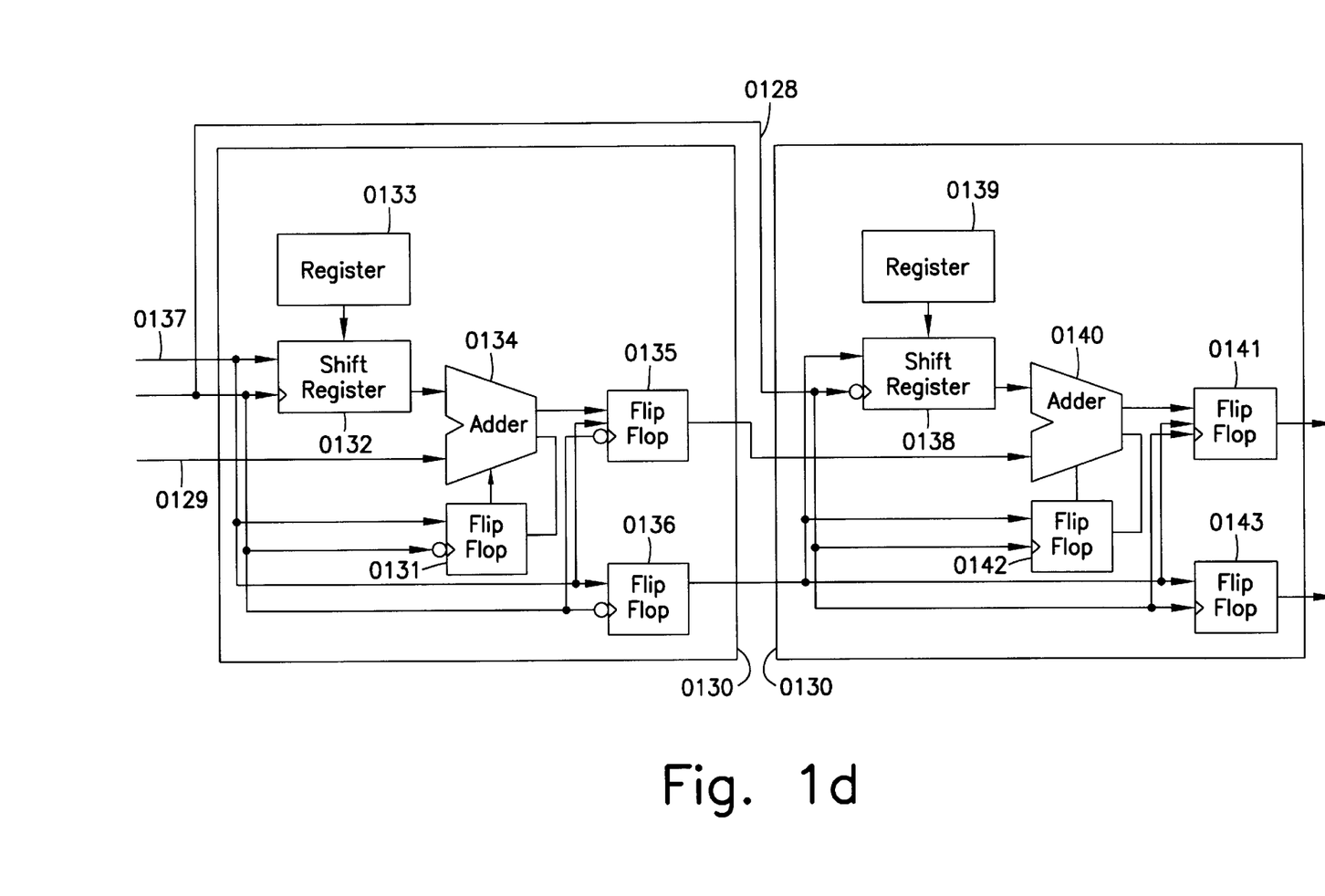

FIG. 1d) shows on the basis of a timing diagram how two logic units are wired for address generation. These logic units are each accommodated in a unit 0130. Both logic units have the same design comprising an adder 0134, 0140 with flip-flop 0131, 0142 for storage of the carry bit, an output flip-flop 0135, 0141, a flip-flop for receiving enable signal 0136, 0143, and a register in which the number of elements of the unit is stored, 0133, 0139, and a shift register 0132, 0138. The difference between the two logic units is that the flip-flops 0141, 0142, 0143 and shift register 0138 of the second logic unit are controlled with the other edge of the clock pulse than flip-flops 0131, 0135, 0136 and shift register 0132 of the first logic unit. As illustrated in the figure, this can be implemented by inverting each clock input of the flip-flops and the shift register or by inverting the clock signal. This ensures that the data is received correctly by the flip-flops and the shift registers.

In wiring several logic units (i.e., several configurable elements in succession), the edge of the clock pulse with which the data is accepted into the flip-flops and the shift registers is always alternated. This results in correct data transfer, and the data packet is passed through the units.

Figure 1E:
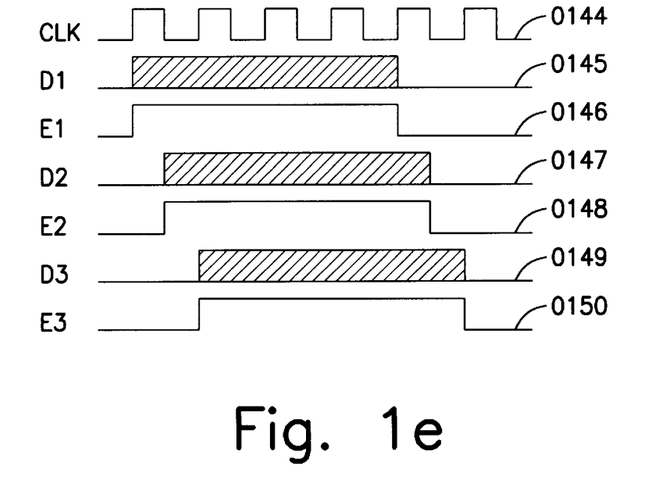

FIG. 1e) shows the signal characteristics of the data signal and the enable signal for the case of wiring multiple logic units. The signal CLK 0144 represents the clock signal of the unit. D1 0145 and E1 1046 are the data and enable signals at the input of the first logic unit. D2 0147 and E2 0148 are the data and enable signals at the output of the first logic unit. They are delayed by half a clock pulse in comparison with the signals at the input because they are accepted by the flip-flops and the shift register only at the trailing edge of the clock pulse (see FIG. 1d). At the same time, they form the input signals for the downstream logic unit for address calculation. They are delayed there again by a half clock pulse and go to the output where they form signals D3 0149 and E3 0150.

Figure 2:
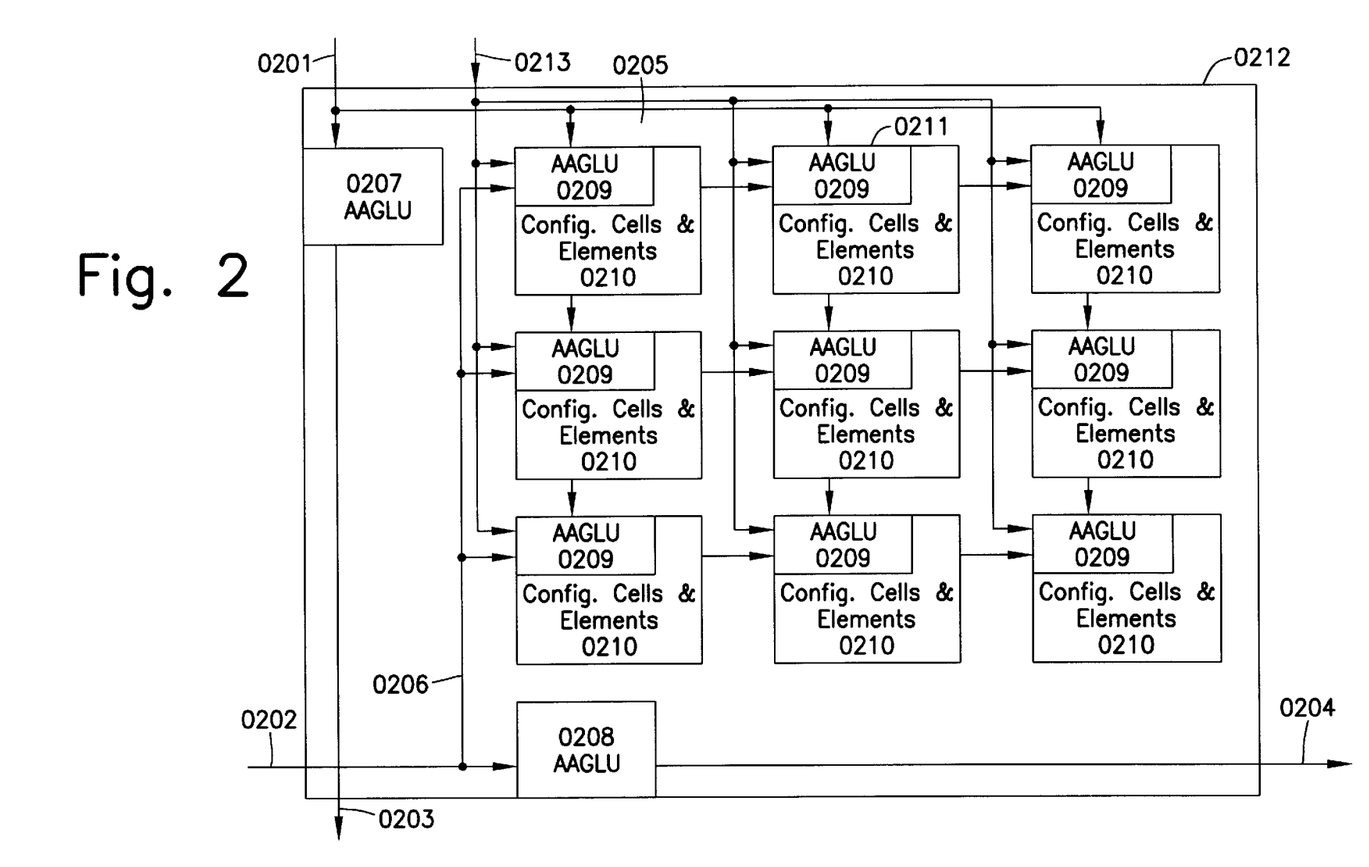
FIG. 2: Unit with automatic address generation and several configurable elements.

FIG. 2 shows a unit 0212 of a cluster with several configurable elements 0211. Each of these elements 0211 has configurable cells and elements 0210 used for configuration. In addition, each element 0211 contains a comparator according to PACT02 (FIG. 3: 0301) and a logic unit for calculating element address 0209, the comparator being responsible for decoding the address in access to an element. It is thus possible to address the individual elements of a unit. In addition, the unit contains a logic unit for automatic address generation 0207, which is performed as in FIG. 1. The Y address of the last element of the preceding unit in the Y direction goes to unit 0212 over bus 0201 and is processed further in the logic unit for automatic address generation 0207. This address is transmitted over connection 0205 to elements 0211 of the first row of the unit. Line 0203 serves to transmit the Y address of the last element of this unit in the Y direction to the next unit in the Y direction. The X address of the last element of the preceding unit in the X direction goes over connection 0202 to unit 0212 and is processed further in the logic unit for automatic address generation 0208. It is transmitted over connection 0206 to elements 0211 of the first column of unit 0212. Line 0204 serves to transmit the X address of the last element of this unit to the next unit.

The address of the element which is to be addressed for a reconfiguration, etc., goes to cells 0211 over bus 0213.

It would also be possible to omit the logic unit for automatic address generation 0207, 0208 in addressing. To do so, the Y address of the last element of the unit and the X address of the last element of the unit would have to be brought out to relay the address data to the next unit. These signals then replace signals 0203, 0204.

Figure 3A:
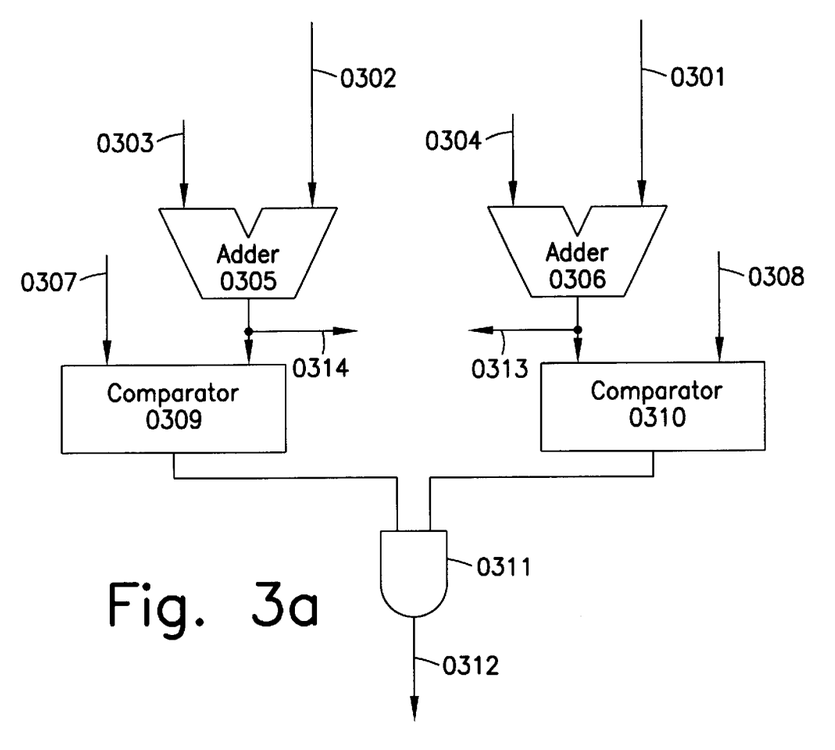

FIG. 3a) shows the layout of the comparator and address generation of elements 0211 from FIG. 2 in parallel transmission of the address data. In adder 0305 a one is added to the X address of the preceding element applied over connection 0302. This X address is compared in comparator 0309 with X address 0307 coming from the outside. In adder 0306, a one 0304 is added to the Y address of the preceding element applied over connection 0301. Then comparator 0310 compares this value with the Y address of the element being addressed, applied over connection 0308. Signal 0312 for activation of the element is generated via an AND gate 0311. Connection 0314 serves to transmit the calculated X address to the next element. The Y address is transmitted over connection 0313.

Figure 3B:
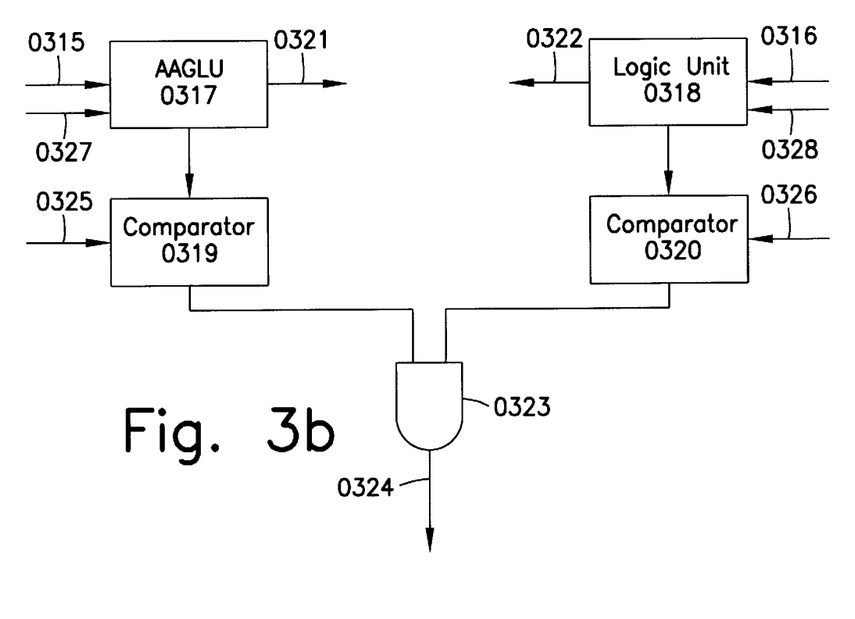

FIG. 3b) shows the architecture of the comparator and address generation of elements 0211 from FIG. 2 with serial transmission of the address data. For this purpose, a one is added serially to the serial bit stream of the address of the preceding element in the X direction 0315 in the logic unit for address generation 0317, and the address is stored in a shift register. The logic receives the clock signal of the unit through line 0327. The address is transmitted serially to the next element over line 0321. In comparator 0319, the address stored in 0317 is compared with the X address, applied over line 0325, of the element to be addressed. The procedure takes place in a similar manner for the Y address. A one is added to Y address 0316, which has been transmitted serially in the Y direction from the preceding cell, in the logic unit for address generation 0318. The logic unit receives the clock signal of the unit over line 0328. The address is conveyed serially to the next element in the Y direction over connection 0322. In comparator 0320, the address stored in 0318 is compared with the Y address, applied over connection 0326, of the element to be addressed. The outputs of the two comparators 0319, 0322 are linked over an AND gate 0323 and form the enable signal 0324 for the configurable element.

Figure 3C:
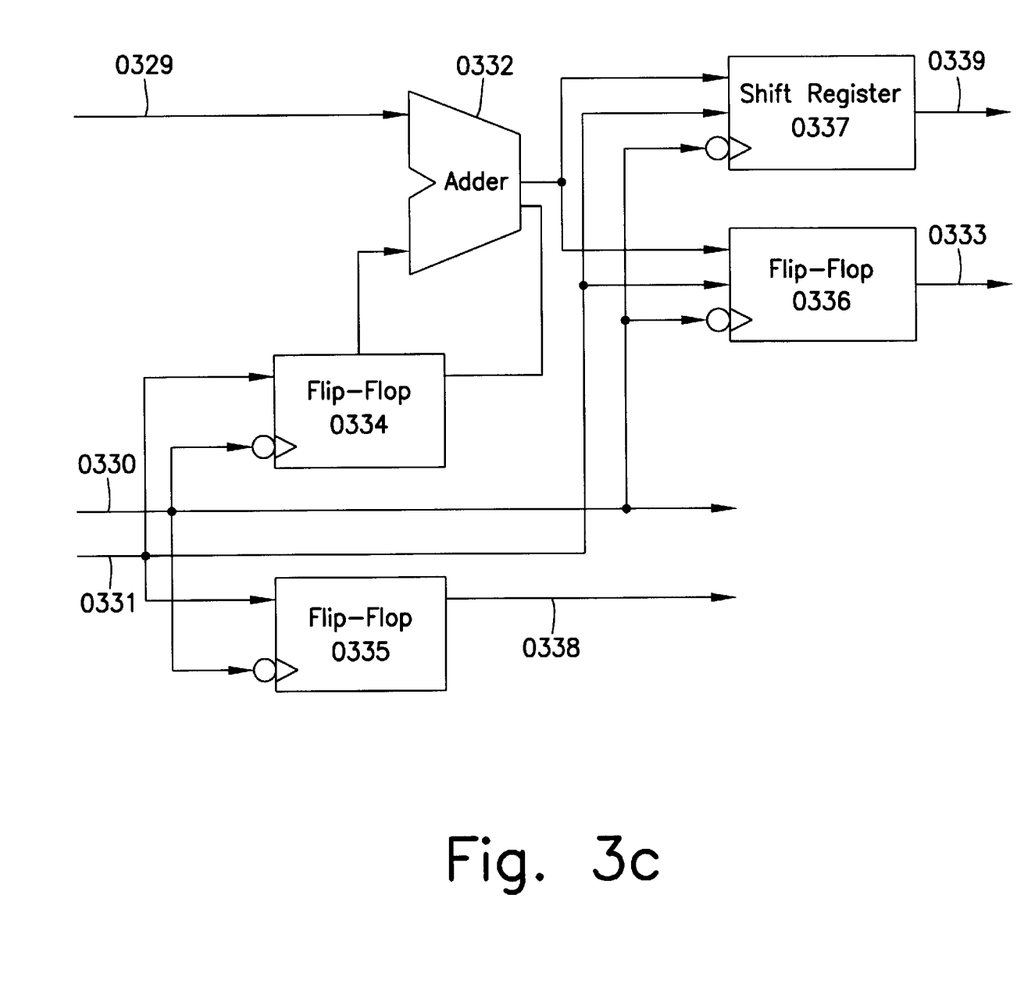

FIG. 3c) shows the logic unit for address generation 0317, 0318 from FIG. 3b. The address goes over line 0329 to adder 0332. Flip-flop 0334 serves to store the carry-over which occurs in addition. It always accepts the carry-over with the negative edge of clock signal 0330. Furthermore, this flip-flop is initially set at one, so that a one is added with the addition of the first bit. The newly calculated address is sent to the next shift register 0337 and to the output flip-flop 0336, where it accepted with the negative edge of the clock pulse. Shift register 0337 stores the individual bits, so that the address of the element is stored in the shift register at the end of the transmission. This is then retransmitted to the comparator over line 0339. The data of the address is sent serially to the next element over line 0333. Line 0331 transmits an enable signal to the flip-flops and the shift register. This enable signal runs in sync with the data signal, i.e., when data is transmitted, an enable signal is transmitted at the same time. The enable signal is accepted by flip-flop 0335 with the negative edge of the clock pulse and transmitted over line 0338 to the next element. The data transmission takes place as illustrated in FIG. 1c. Here again, when several logic units are connected in succession, the clock pulse or the clock inputs of the flip-flops and shift registers must be inverted with each subsequent logic unit, so the data is always accepted with the rising edge and the trailing edge in alternation.

Figure 4:
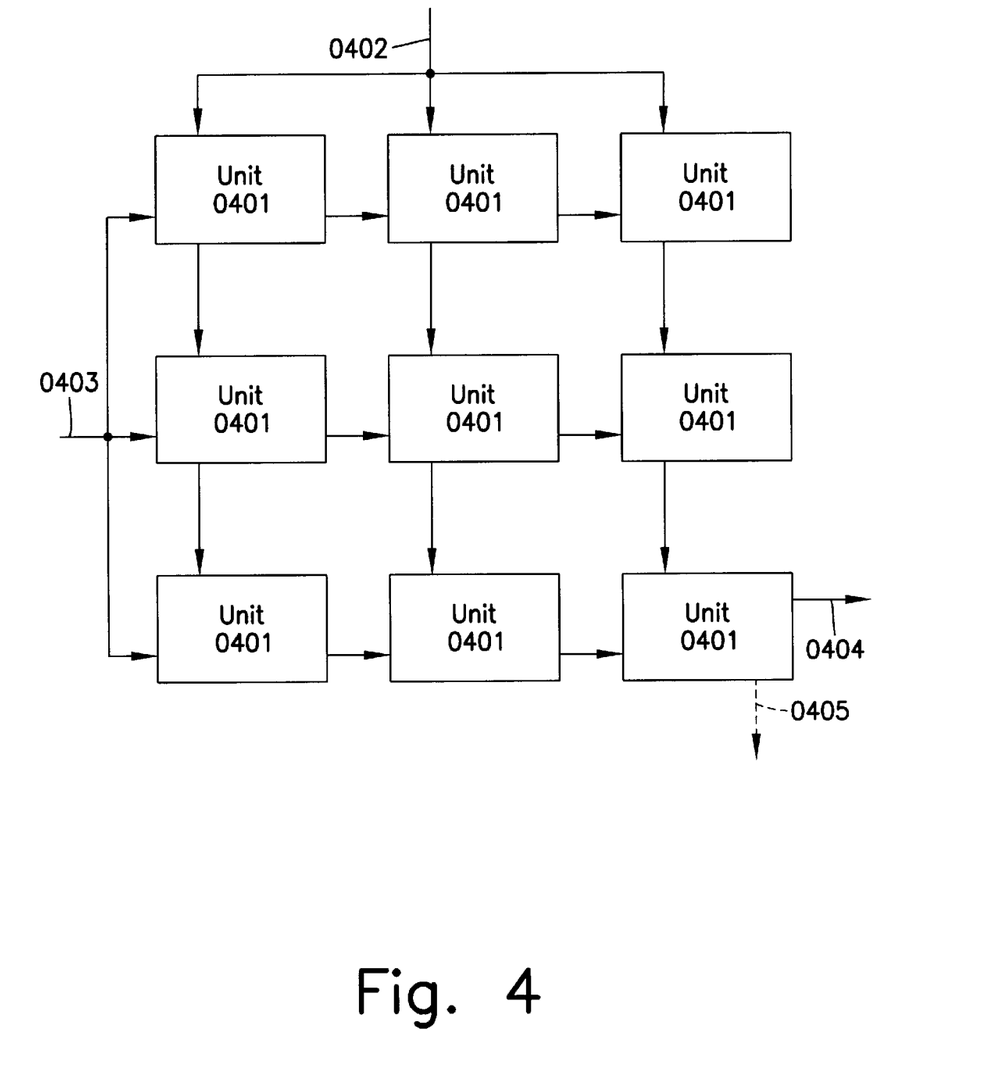
FIG. 4: Cluster of several units and their interconnection.

FIG. 4 shows the wiring of several units 0401 to form a cluster. The Y base addresses of the units are initialized at the upper edge of the cluster over connection 0402. The X base addresses of the units at the left edge of the cluster are initialized over connection 0403. In parallel addressing, it is sufficient to apply the base addresses to the inputs. For addressing with serial data transmission, the data packet with the base address and an enable signal must be transmitted serially to the unit. The units inside the cluster are automatically allocated X and Y base addresses over the interconnections by the method illustrated in FIG. 1. Connections 0404 and 0405 serve to transmit the size of the cluster to external elements. Connection 0404 serves to transmit the size in the X direction, and the size of the cluster in the Y direction is transmitted over connection 0405.

Figure 5A:
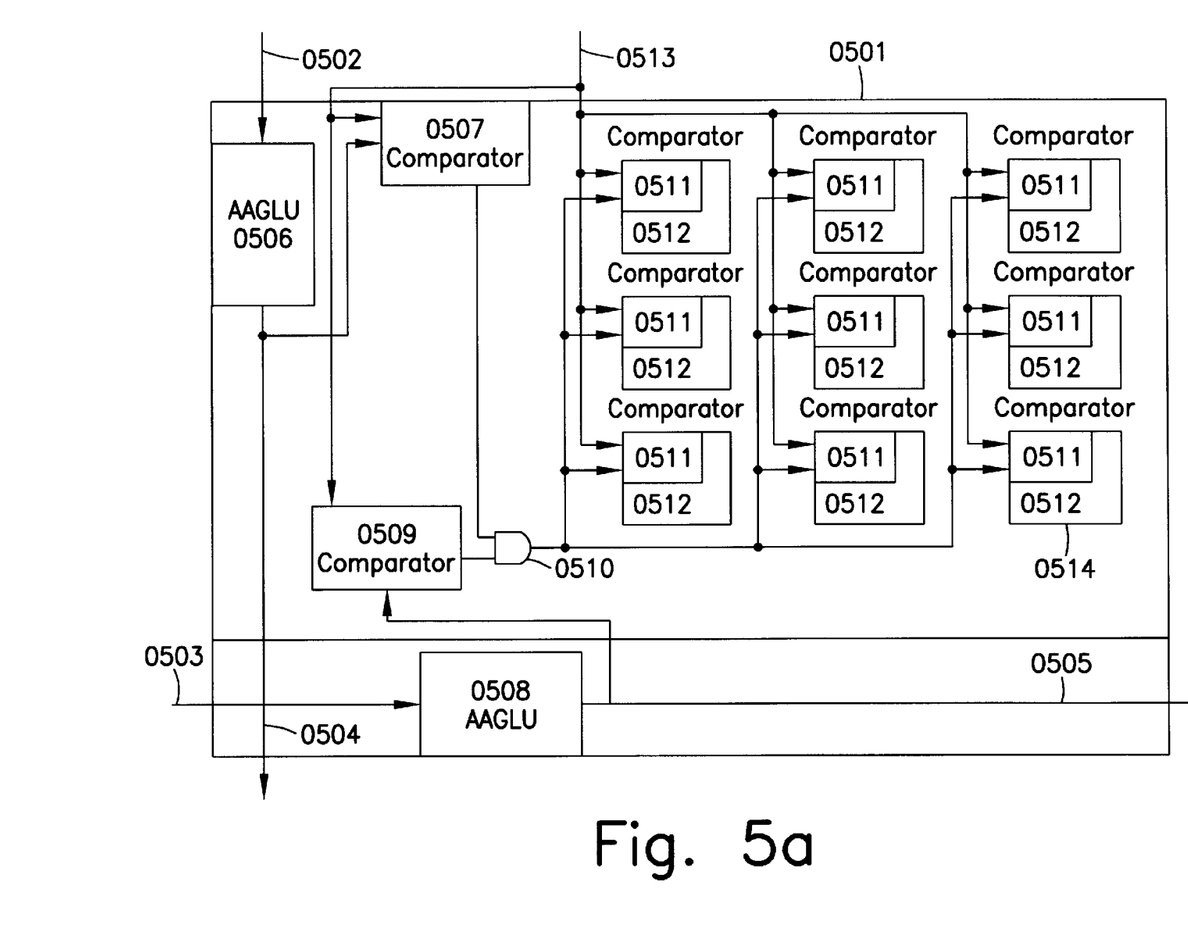

FIG. 5a) shows the layout of a unit 0501 which contains a plurality of configurable elements 0514, containing configurable cells and cells used for configuration, plus a logic unit for automatic address generation 0506, 0508. Addressing of units 0501 and configurable elements 0514 takes place by an alternative method here. The address has the following structure:

| X position of unit | X position of element | Y position of unit | Y position of element |
|---|---|---|---|

The data of the X and Y addresses is transmitted to unit 0501 through connections 0502, 0503. In addition, this data is also retransmitted to comparators 0507, 0509. Within unit 0501, the data is further processed by the logic unit for automatic address generation 0506, 0508. In this processing, a one is added to the address of unit 0501 in the X and Y directions, but the number of elements in the X and Y directions of unit 0501 is not added as in the preceding method of addressing. The data is retransmitted to the next unit over connections 0504, 0505. When an address is sent over line 0513, the address part that addresses the units is sent to comparators 0507, 0509. The part of the address that addresses elements 0514 is sent to elements 0514. Then the automatically generated unit address is compared in comparators 0507, 0509 with the unit address applied over line 0513, and in the event of a match, a signal is sent to AND gate 0510 which sends an enable signal to configurable elements 0514. Comparators 0511 of elements 0514 compare their address with the address applied over connection 0513 and activate it if they match and if there is an applied enable signal from comparators 0507, 0507 of the unit.

Figure 5B:
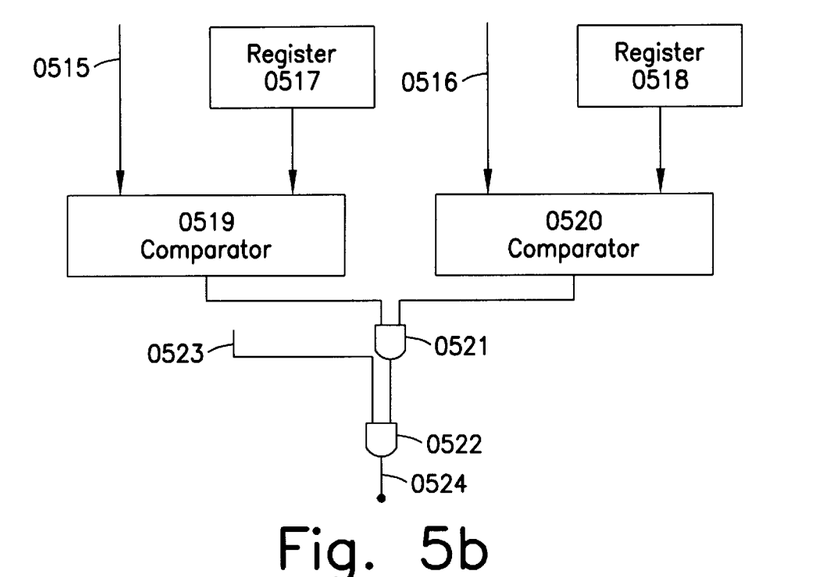

FIG. 5b) shows the logic unit for addressing an element (see comparator 0511) which is needed for the alternative addressing method. Connections 0515 and 0516 serve to transmit an X and Y address with the help of which an element is to be addressed. These two values are compared in comparators 0519 and 0520 with the X and Y addresses of the element stored in registers 0517 and 0518. The addresses of elements 0514 can of course also be generated in the manner described previously (see FIG. 3). The outputs of the two comparators 0519 and 0520 are linked via AND gate 0521. The output of AND gate 0521 is linked with enable signal 0523 of the comparators of the unit address (see FIG. 5a 0510) via an AND gate 0522 and forms enable signal 0524 for elements 0514 of unit 0501.

Figure 6:
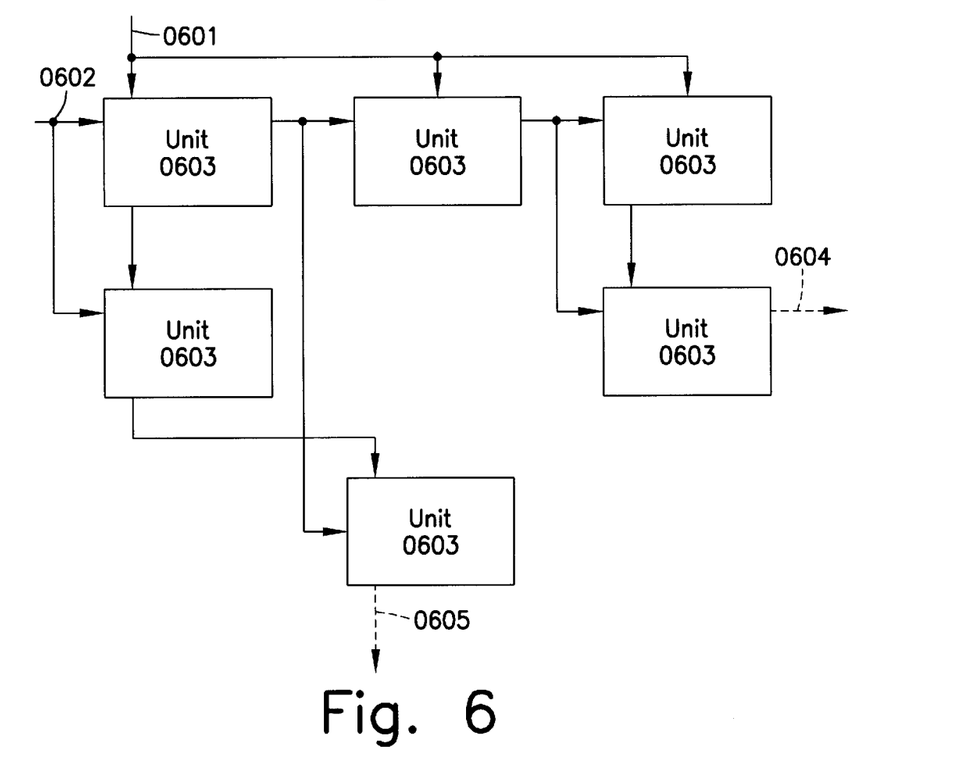
FIG. 6: Cluster with incomplete rows or columns.

FIG. 6 shows a cluster of units 0603 whose columns and rows are not complete. Therefore, a slightly different wiring of units 0603 is necessary, as illustrated in this figure. Connections 0601 and 0602 serve to initialize the units of the first row and column because they do not have any predecessors in this direction. The extent of the cluster in the X and Y directions can be queried over connections 0604 and 0605.

What is claimed is:

1. A method of dynamically generating addresses for a plurality of configurable units, each of the plurality of configurable units including a plurality of cells in a multi-dimensional arrangement, comprising the steps of:

for each dimension of the multi-dimensional arrangement, receiving at an address input of a first unit of the plurality of configurable units a respective base address for a first cell of the plurality of cells of the first unit;

determining cell addresses for the plurality of cells of the first unit as a function of the base address received for each dimension of the multi-dimensional arrangement;

for each dimension of the multi-dimensional arrangement, determining a respective last address corresponding to a last cell of the configurable unit;

for each dimension of the multi-dimensional arrangement, determining a respective next address as a function of the respective last address; and for each dimension of the multi-dimensional arrangement, providing the respective next address to a respective second unit of the plurality of configurable units via an address output of the first unit;

wherein each respective next address is assigned as a base address for the respective second unit.

2. The method according to claim 1, wherein each respective second unit is adjacent to the first unit.

3. The method according to claim 1, wherein each respective next address is determined by incrementing the respective last address.

4. The method according to claim 1, wherein for each dimension of the multi-dimensional arrangement, each respective base address is received by a different address input of the first unit.

5. The method according to claim 1, wherein for each dimension of the multi-dimensional arrangement, each respective next address is provided to the respective second unit via a different address output.

6. The method according to claim 1, wherein the address input of the first unit includes a first parallel bus, and the address output of the first unit includes a second parallel bus.

7. The method according to claim 1, wherein the address input of the first unit includes a first serial bus, and the address output of the first unit includes a second serial bus.

8. The method according to claim 1, wherein each respective base address received by the first unit is relayed from a first cell of the plurality of cells of the first unit to a next cell of the plurality of cells of the plurality of cells of the first unit, the first cell incrementing each respective base address before relaying each respective base address to the next cell.

9. The method according to claim 8, wherein the last cell is connected to the address output, the last cell having the highest addresses for all dimensional of the multi-dimensional arrangement.

10. The method according to claim 8, wherein for each dimension of the multi-dimensional arrangement, an adder determines the next respective address as a function of a total number of the plurality of cells along the dimension and provides the next respective address to the address output.

11. The method according to claim 10, wherein the adder includes a parallel adder.

12. The method according to claim 10, wherein the adder includes a serial adder.

13. The method according to claim 1, wherein the first unit includes a primary logic unit, and each of the cell addresses is compared with a generated address provided by the primary logic unit using a comparator to establish access.

14. The method according to claim 1, wherein the plurality of configurable units are coupled in cascade, and wherein a linear address space is formed from the plurality of cells of each of the configurable units over the plurality of cascaded configurable units by linearly allocating the cell addresses over the plurality of cascaded configurable units.

15. The method according to claim 1, wherein no linear address space is formed from the plurality of cells over a group of cascaded units of the plurality of configurable units by assigning an offset address for each one of the plurality of configurable units and a linear address for each of the plurality of cells.

16. The method according to claim 1, wherein the multi-dimensional arrangement has two dimensions.

* * * * *